United States Patent [19]

Hervert

[11] 3,997,689
[45] Dec. 14, 1976

[54] PREPARATION OF SEMICONDUCTING PYROPOLYMERIC INORGANIC REFRACTORY OXIDE MATERIALS

[75] Inventor: George L. Hervert, Woodstock, Ill.

[73] Assignee: UOP Inc., Des Plaines, Ill.

[22] Filed: July 17, 1975

[21] Appl. No.: 596,707

[52] U.S. Cl. .................. 427/82; 427/213; 427/220; 427/221; 427/248 H; 427/255
[51] Int. Cl.[2] ................................ B05D 5/12
[58] Field of Search ............ 427/58, 82, 86, 212, 427/213, 215, 220, 221, 248, 255, 398, 249, 122, 226, 228, 248 E, 248 G, 248 H, 374, 377, 378, 384, 385, 388; 118/48; 252/500, 502, 503, 506; 423/439, 440, 414

[56] References Cited

UNITED STATES PATENTS

| | | | |
|---|---|---|---|
| 3,130,070 | 4/1964 | Potters et al. | 427/221 X |
| 3,679,463 | 7/1972 | Fleischner | 118/48 X |
| 3,754,529 | 8/1973 | Fleischner | 118/48 |
| 3,811,916 | 5/1974 | Russell et al. | 427/213 |
| 3,916,066 | 10/1975 | Youtsey et al. | 427/255 X |
| 3,940,509 | 2/1976 | Youtsey et al. | 427/82 |
| R28,635 | 12/1975 | Youtsey et al. | 428/409 |

*Primary Examiner*—Thomas J. Herbert, Jr.
*Assistant Examiner*—Bruce H. Hess
*Attorney, Agent, or Firm*—James R. Hoatson, Jr.; Raymond H. Nelson; William H. Page, II

[57] ABSTRACT

Semiconducting carbonaceous pyropolymeric inorganic refractory oxide materials are prepared by introducing inorganic refractory oxide materials into a reaction section which may comprise a horizontal screw reactor wherein said inorganic refractory oxide materials are contacted with a gasified hydrocarbon thereby maintaining the inorganic refractory oxide material in a semifluidized state. Following this contact, the resultant carbonaceous pyropolymer coated inorganic refractory oxide material is then cooled and recovered.

4 Claims, 2 Drawing Figures

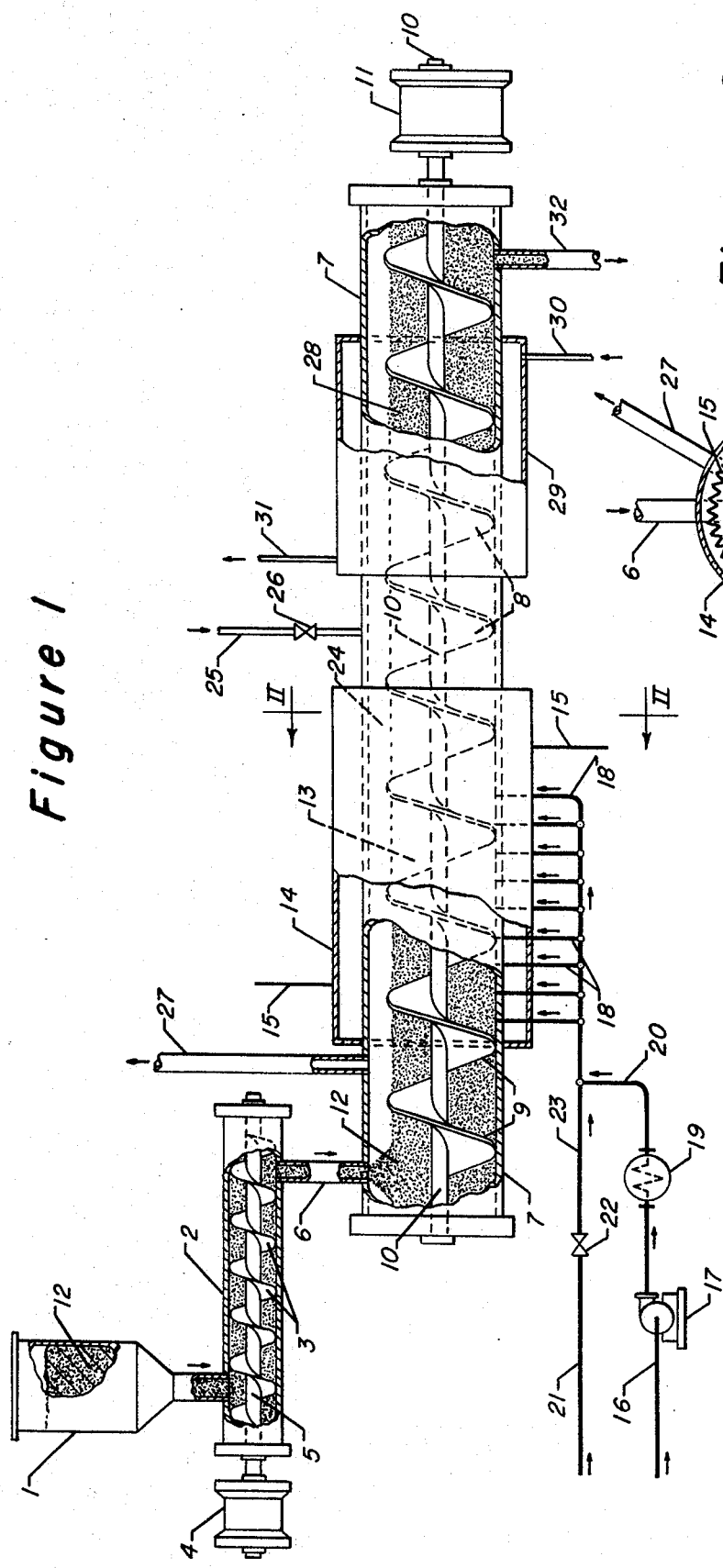
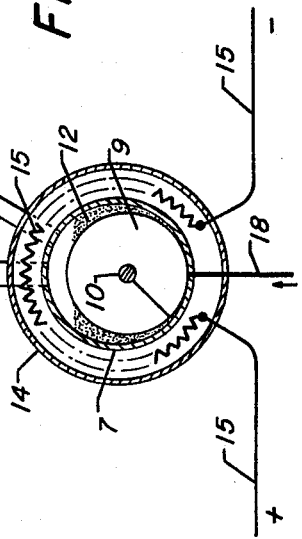

PREPARATION OF SEMICONDUCTING PYROPOLYMERIC INORGANIC REFRACTORY OXIDE MATERIALS

This invention relates to a process for the preparation of carbonaceous semiconducting pyropolymeric inorganic refractory oxide materials. More specifically, the invention is concerned with a process for the preparation of such material and to an apparatus for effecting such preparation.

Heretofore, semiconducting materials which are useful in the electrical field have been prepared by various methods. For example, it is known in the prior art to prepare a semiconducting material by impregnating a ceramic material with a solution of a carbonaceous decomposable material such as sugar in the presence of a solvent, the boiling point of said solvent, one example of which being glycerol, is substantially above the decomposition temperature of the carbonaceous decomposable material. After decomposition of the carbonaceous material by heat, the solvent is thereafter removed by an additional heat treatment and the porous ceramic body is further impregnated with a pyrolyzable resin which is thereafter pyrolyzed to remove any remaining prorosity. Another type of semiconducting material which is known in the art is formed from polymeric aromatic compounds based on phthalaldehyde. These aromatic compounds are pyrolyzed at temperatures ranging from about 300° to about 1200° C. and preferably in a range of from about 400° to 700° C. However, the semiconducting materials which are obtained by the pyrolysis of these aromatic compounds, such as phthalaldehyde, possess conductivities which range from about $10^{-3}$ to about $10^{-10}$ inverse ohm-centimeters at a temperature of about 40° C. and a conductivity in the range of from about $10^{-1}$ to about $10^{-8}$ inverse ohm-centimeters at an elevated temperature of about 320° C.

Another method of preparing semiconducting materials comprises batch type operations in which a refractory inorganic oxide substrate is placed in a vessel and a decomposable hydrocarbon in gaseous form is passed over the surface of the substrate at a pyrolysis temperature for a predetermined period of time, after which heating is discontinued, passage of the hydrocarbon over the substrate is also discontinued and the semiconducting material is recovered.

In contradistinction to the above set forth methods of preparing semiconducting pyropolymeric inorganic refractory oxide materials, the present invention is concerned with a continuous method for the preparation of this type of material and also to an apparatus which is useful for effecting this preparation.

The semiconducting carbonaceous pyropolymeric inorganic refractory oxide material which is prepared according to the process of this invention utilizing the apparatus hereinafter described in greater detail may be used in conducting devices such as heterojunction transistors, field effect transistors, thermo element in thermo electrical generators and refrigerators and temperature sensing devices, resistors, charge and energy storing devices, memory devices, inductive elements, inks, and a variety of other electrical applications.

It is known that hydrocarbons may be pyrolyzed to yield pyropolymers having various compositions. Pyrolysis is characterized by heating the substance in the absence of oxygen in order to achieve a change in the molecular structure. If pyrolysis of an organic pyrolyzable substance is carried to the extreme degree, graphitic carbon will result. The degree of conductivity of the finished product will be dependent upon the degree to which pyrolysis is carried out. It is therefore essential to effect the pyrolysis in such a manner so that the desired product will comprise a semiconducting material in which at least a monolayer of a highly carbonaceous pyropolymer is formed on the refractory oxide.

It is therefore an object of this invention to provide an economical process whereby a semiconducting carbonaceous pyropolymeric inorganic refractory oxide material may be prepared in a continuous manner.

Another object of this invention is to provide an apparatus whereby the desired semiconducting carbonaceous pyropolymeric inorganic refractory oxide material may be prepared in a continuous manner.

In one aspect an embodiment of this invention resides in a process for the preparation of a semiconducting carbonaceous pyropolymeric inorganic refractory oxide material which comprises laterally introducing inorganic refractory oxide material into a reaction section, simultaneously introducing a gaseous hydrocarbon pyropolymeric precursor into said zone and effecting a semifluidized contact of said inorganic refractory oxide material with said gaseous hydrocarbon, removing residual gaseous hydrocarbon, and withdrawing and recovering the resultant semiconducting carbonaceous pyropolymeric inorganic refractory oxide material.

Another embodiment of this invention is found in a continuous semifluidized bed system for preparing a semiconducting carbonaceous pyropolymeric inorganic refractory oxide material which comprises in combination a laterally disposed tubular reaction section, means for introducing the inorganic refractory oxide into one end of said reaction section and means for withdrawing pyropolymeric inorganic refractory oxide material from the other end thereof, means for introducing a gaseous hydrocarbon pyropolymeric precursor into said reaction section, means for withdrawing residual gaseous hydrocarbon, heating means substantially encompassing said reaction section for maintaining a pyrolyzing temperature in said reaction section, and means for maintaining a lateral movement of said contacted inorganic refractory oxide material through said reaction section.

A specific embodiment of this invention resides in a process for the preparation of a semiconducting carbonaceous pyropolymeric inorganic refractory oxide material which comprises laterally introducing inorganic refractory oxide material in the form of particles into a reaction section, simultaneously intoducing a gaseous hydrocarbon pyropolymeric precursor admixed with an inert oxygen-free gaseous stream into said zone and effecting a semifluidized contact of said inorganic refractory oxide material with said admixture of gaseous hydrocarbon and inert oxygen-free gaseous stream, removing residual gaseous hydrocarbon, cooling the resultant semiconducting carbonaceous pyropolymeric inorganic refractory oxide material and withdrawing said material to storage.

Other objects and embodiments will be found in the following further detailed description of the present invention.

As hereinbefore set forth in the present invention relates to a continuous process for the preparation of a semiconducting carbonaceous pyropolymeric inorganic refractory oxide material and to an apparatus for effecting the preparation. The semiconducting carbonaceous pyropolymeric inorganic refractory oxide material is prepared by treating an inorganic refractory oxide material with a pyrolyzable hydrocarbon wherein a carbonaceous pyropolymer is deposited on the substrate in at least a monolayer of said pyropolymer. The inorganic refractory oxide material which may be used as the substrate or base may be in any form such as loose dry powders, substrates in the form of flats, cylinders and spheres, rods, pellets, etc., the only criterion being that the size of the particles of the substrate be small enough to be maintained in a semifluidized state when contacted with the gaseous hydrocarbon pyropolymer precursor. In the preferred embodiment of the present invention, the inorganic refractory oxide base will be characterized as possessing a high surface area, said surface area being from about 1 to about 500, and preferably from about 25 to about 500 square meters per gram. Illustrative examples of inorganic refractory oxides which may be used will include alumina in various forms, and especially gamma-alumina, silica and silica-alumina. In addition, it is also contemplated within the scope of this invention that the refractory oxide prior to treatment with the gaseous hydrocarbon to form a carbonaceous pyropolymer thereon, may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromoethane, chloroethane, bromoethane, chloropropane, bromopropane, iodopropane, chlorobutane, bromobutane, iodobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzaldehyde, acetophenone, benzophenone, benzoquinone, benzoic acid, phenyl acetic acid, furan, furfural, pyran, coumarin, indole, etc. It is to be understood that the aforementioned compounds are only representative of the class of compounds which may undergo pyropolymerization and that the present invention is not necessarily limited thereto.

The material which will be formed according to the process of this invention will be a high surface area semiconducting material comprising a catalytically active high surface area refractory oxide and a carbonaceous pyropolymer containing recurring carbon and hydrogen units forming at least a monolayer on said refractory oxide, the semiconducting material possessing a conductivity at room temperature in the range of from about $10^{-8}$ to about $10^{+3}$ inverse ohm-centimeters.

The continuous process in which the aforementioned semiconducting material is formed will be effected by laterally introducing an inorganic refractory oxide material of the type hereinbefore set forth in greater detail into a reaction section. The introduction of the inorganic refractory oxide material into the reaction section can be effected in any suitable manner such as, for example, by gravity flow or forced means of introduction such as that provided for by an auger type of mechanism whereby the particles of inorganic refractory oxide material are forced from a feed source into said reaction section, the only criterion of said introductory means being that there is a sufficient amount of pressure exerted by the force of the particles into the reaction system to prevent any reverse flow of particles back into the feed source. In the preferred embodiment of the invention, the reaction section will be provided with means for maintaining a horizontal flow of the inorganic refractory oxide material through the length of the reaction section. These means, in one embodiment, will comprise an auger screw member which extends throughout the length of the reaction section as well as subsequent sections of the reactor such as a stabilization section and cooling section which will hereinafter be described in greater detail. While the inorganic refractory oxide material is being carried through the reaction section, it is subjected to treatment with a gaseous hydrocarbon pyropolymeric precursor, said gaseous hydrocarbon being introduced into the reaction zone through appropriate means such as gas vents. If so desired, the gaseous hydrocarbon may be admixed with an inert hydrocarbon carrying oxygen-free gas such as nitrogen. The reaction section of the reactor is substantially surrounded by heating means whereby the gaseous hydrocarbon upon passage therethrough and upon introduction into the reaction zone will be at a temperature sufficient to cause pyropolymerization of the gaseous hydrocarbon precursor. The temperature of the reaction section, in order to effect the desired pyropolymerization of the gaseous hydrocarbon pyropolymeric precursor, will be maintained in a range of from about 700° to about 1,000° C. or more, the particular pyropolymerization temperature being dependent upon the degree of conductivity which is to be imparted to the semiconducting pyropolymeric inorganic refractory oxide material. The gaseous hydrocarbon pyropolymeric precursor and the inert oxygen free gas are charged to the reaction system in an amount which is sufficient to maintain the inorganic particulate substrate in a semifluidized state through its passage through the pyrolysis or reactor section. By utilization of the rotating auger screw, the gaseous hydrocarbon which pyropolymerizes upon the substrate is maintained in constant contact and thus will enable the substrate to be uniformly subjected to the carbonaceous pyropolymeric coating. After passing through the reaction section the thus carbonaceous pyropolymer treated substrate passes through a stabilization zone where, if so desired, it may be subjected to a stripping action by contact with an inert oxygen-free gas which will act to remove any pyropolymeric material and may be present in the atmosphere. After passage through the stabilization section, the semiconducting carbonaceous pyropolymeric inorganic refractory oxide material passes through a cooling zone wherein the material is cooled to a temperature in the range of from about 150° C. to about 200° C. and thereafter is passed to storage.

By utilizing means such as an auger type screw member to maintain a lateral movement of the inorganic refractory oxide material through the pyrolysis or reaction section, stabilization section and cooling section which comprise the reactor, it is possible to control the speed of said material through said reactor. By controlling the residence time within the reactor by varying the speed of the rotating auger type screw member and by controlling the temperature of the pyrolysis, it is possible to obtain conducting materials which possess a desired conductivity. For example, by utilizing temperatures within the lower portion of the range hereinbefore set forth, it is possible to obtain conducting materials which possess a conductivity ranging from about $10^{-8}$ to about $10^0$ inversse ohm-centimeters. Conversely, by utilizing pyrolysis temperatures above 700° C. and preferably in a range of from about 900° up to about 1,200° C., it is possible to obtain conductivities ranging from about $10^0$ to about $10^{+3}$ inverse ohm-centimeters. Likewise, the residence time will also provide an operating parameter which will effect the conductivity, said residence time during which the inorganic refractory oxide material is contacted with the pyropolymer precursor and passes through the reaction section, stabilization section and cooling section will range from about 0.5 hours up to about 24 hours in duration.

The present invention will be further illustrated with reference to the accompanying drawings in which FIG. I illustrates a simplified side view of the apparatus utilized for the preparation of the semiconducting pyropolymeric inorganic refractory oxide material.

FIG. II is a cross-section of the apparatus taken along the lines II—II of FIG. I.

It is to be understood that various valves, pumps, etc., have been reduced, or entirely eliminated, as not being essential to the complete understanding of the present invention. The utilization of these, as well as other similar appurtenances, will become obvious as the drawing is described.

Inorganic refractory oxide is contained in a feed source 1, said inorganic refractory oxide being in any shape or form as desired and, in the preferred embodiment of the invention, in the shape of particles having a size of from .1 to about 2,000 microns and preferably in a range of from about 10 to about 150 microns in diameter. The aforementioned inorganic refractory oxide substrate passes from feed supply 1 to a tubular section 2 which is provided with a rotating screw member 3 driven by a varying-speed means 4 which is provided with axle 5. The substrate is maintained in a lateral movement through tubular section 2 and passes by means of conduit 6 into a reactor 7. This reactor is also provided with a rotating screw member 8, said rotating screw member 8 comprising flights 9 fixed to axle 10 and driven by a varying-speed drive mechanism 11. In the preferred embodiment of the apparatus, flights 9 will possess a diameter approximately 60 to 70% of the diameter of the tubular reactor. In addition, axle 10 will be displaced at some point downwardly from the center axis of reactor 7. This then will permit the bottoms of flights 9 to contact the bottom of reactor 10 and thus prevent a build-up of material on the bottom of the reactor. This prevention of build-up is important inasmuch as the pyropolymeric coated inorganic oxide will act as an insulating material and consequently will contribute to a heat loss in the reactor. The inorganic refractory oxide material 12 is maintained in lateral movement through reactor 7 and enters into a pyrolysis or reaction section 13. Pyrolysis or reaction section 13 is substantially surrounded by heating means 14, the heat for said heating means being supplied from an extraneous source not shown in the drawing and which may, in one embodiment thereof, comprise an electrical heat source, the electricity being charged to said heating means 14 by means of lines 15. In pyrolysis or reaction section 13 the inorganic refractory oxide material which is maintained in a lateral movement through the rection section is admixed with a gaseous hydrocarbon pyropolymeric precursor. This gaseous hydrocarbon is charged to the pyrolysis or reaction section through lines 16 and pump 17 by means of a plurality of inlet vents 18 spaced longitudinally throughout substantially the length of the reaction section. While, in one embodiment, the hydrocarbon which is the pyropolymeric precursor is in gaseous form, it is also contemplated that the hydrocarbon charge stock may be liquid in form. In the event that the hydrocarbon which comprises the charge stock is in liquid form, it is passed through heat exchanger 19 prior to entry into line 20 and inlet vents 18, the passage through heat exchanger 19 being at a temperature sufficient to vaporize or gasify the hydrocarbon in order that said hydrocarbon be charged through vents 18 into reaction zone or section 13 in gaseous form. It is also contemplated within the scope of this invention that the hydrocarbon in gaseous form may be admixed with a hydrocarbon carrying oxygen-free inert gas such as nitrogen. In the event that this carrying gas is used, it is charged through line 21 and valve 22 for admixture with the gaseous hydrocarbon in line 23 prior to entry into inlet vents 18. The pressure which is generated by the addition of the gaseous hydrocarbon and, if so desired, the inert oxygen-free gas, into reaction section 13 will be sufficient to maintain the inorganic particular substrate in a semifluidized state. As hereinbefore set forth, the temperature of heating means 14 will be sufficient in order to maintain a temperature in reaction zone 13 in a range of from about 700° to about 1,000° C., this temperature effecting a pyropolymerization of the gaseous hydrocarbon which is introduced therein. In reaction section 13 the inorganic refractory oxide particular substrate is contacted with the pyropolymer formed therein and at least a monolayer of a carbonaceous pyropolymer containing recurring carbon and hydrogen units is deposited thereon. As hereinbefore set forth, by varying the speed of rotating screw member 8, it is possible to vary the time during which the pyropolymer and the substrate are in contact with each other, this varying time period being utilized to prepare a semiconducting pyropolymeric inorganic refractory oxide material which will possess a particular conductivity.

After passage through pyrolysis or reaction section 13 for a predetermined period of time, the resulting catalytically active high surface area refractory oxide having a carbonaceous pyropolymer comprising recurring carbon and hydrogen units forming at least a monolayer on said refractory oxide will pass into stabilization section 24 and will be maintained therein for a predetermined period of time, said time being dependent upon the speed of the rotating screw member which maintains this material in a lateral movement through the stabilization zone. In one embodiment of the invention, an inert oxygen-free gas such as nitrogen may be admitted into reactor 7 through line 25 by means of valve 26. This inert oxygen-free gas such as nitrogen will act as a stripping means whereby any excess gaseous hydrocarbon, its gaseous byproducts and the inert hydrocarbon carrying gas which was admitted through line 21 will be stripped from the semiconducting pyropolymeric inorganic refractory oxide material and will exit through conduit 27. After passage through stabilization section 24, the semiconducting pyropolymeric inorganic refractory oxide material will pass into cooling section 28 which, like stabilization zone 24, is maintained in axial alignment with reactor section 13. In this section, which is provided with cooling means 29 which substantially encompasses cooling section 28, the semiconducting pyropolymeric inorganic refractory oxide material is cooled to a temperature in the range of from about 150° to about 200° C. The heat transfer means which are utilized to effect the cooling may be, if so desired, water which is admitted to cooling means 29 through line 30 and withdrawn through line 31. After cooling to the desired temperature, the catalytically active high surface area refractory oxide containing a carbonaceous pyropolymer consisting of recurring carbon and hydrogen units which forms at least a monolayer on said refractory oxide is withdrawn and passed to storage through conduit 32.

It is also contemplated within the scope of this invention that the means for withdrawing excess gaseous hydrocarbon, the carbonaceous pyropolymer and the inert hydrocarbon carrying oxygen-free gas which comprises exit conduit 27 may be positioned at a point intermediate between stabilization zone 24 and cooling zone 28, thereby eliminating the necessity for the introduction of a stripping gas.

FIG. 2 illustrates one embodiment of the invention taken through lines II—II of FIG. I. In this embodiment, reactor 7 has heating means 14 substantially encompassing said reactor. The heat for said means is supplied through electrical lines 15 which, when an electric current is applied thereto, supplies an amount of heat sufficient to enable the temperature within the reactor 7 to be maintained in a range of from about 700° to about 1,000° C., this temperature being sufficient to pyropolymerize a gaseous hydrocarbon which is introduced into reactor 7 through line 18. The high surface area inorganic refractory oxide 12 which is introduced into conduit 6 is treated with the carbonaceous pyropolymer in reactor 7 and is maintained in a lateral movement therethrough by means of flights 9 affixed to axle 10.

While the aforesaid discussion has been centered around the use of mechanical means comprising a rotating screw member consisting of flights fixed to an axle and driven by a varying speed drive mechanism, it is also contemplated within the scope of this invention that other means may be utilized to maintain a lateral movement of the high surface area inorganic refractory oxide through the reaction section, stabilization section and cooling section while being subjected to treatment with a carbonaceous pyropolymer in the reaction section of the reactor. For example, the high surface area refractory oxide material may, in another embodiment of the invention, be maintained in a semifluidized state within the reactor by means of pressure from gases which are charged to the reactor which, as hereinbefore set forth, comprises a reaction section, stabilization section and cooling section in axial alignment to one another, through a plurality of gas vents which are positioned throughout the length of the reactor in spaced alignment to one another and at an angle sufficient to maintain the material in a semifluidized flow through the entire length of the reactor. The gas which is utilized to effect the semifluidized state of the substrate will comprise an inert oxygen-free gas such as nitrogen, although it is also contemplated that other inert gases such as helium, argon, etc., may also be used.

The following examples are given merely for purposes of illustrating the process and apparatus of the present invention. However, these examples are not intended to limit the generally broad scope of the present invention in strict accordance therewith.

EXAMPLE I

A tubular reactor which has a working length of 108 inches and which possesses an inside diameter of 6 inches is provided with an auger screw mechanism, the blades of the auger being about 3.5 inches in diameter and which are attached to a shaft, the shaft of said auger screw mechanism being displaced downwardly from the center of the reactor and driven by a variable speed mechanism. The reactor will consist of three sections, namely, a pyrolysis or reaction section, a stabilization section and a cooling section, all of which are in coaxial alignment to each other. A gamma-alumina is fed to the reaction section at a rate of 4.8 lbs/hour for a total of 115.2 lbs/day. Propane is fed into the reaction section, which is maintained at a temperature of about 900° C. by means of an electrical heating system. The propane is fed to the reaction system at a rate of 4.68 lbs/hour or 112.3 lbs/day. The aforementioned auger screw mechanism is driven by the variable speed mechanism at such a speed so that the admixture of the alumina particles and propane is maintained in the 60 inches long pyrolysis or reaction section for a period of 1.5 hours. It is to be noted that the injection of the propane through a multiplicity of vents is sufficient to maintain the alumina particles, which are less than 10 microns in size, in a semifluidized state throughout the length of the reaction section. The thus formed semiconducting carbonaceous pyropolymeric inorganic refractory oxide material which consists of the catalytically active high surface area alumina containing a carbonaceous pyropolymer consisting of recurring carbon and hydrogen units forming at least a monolayer on the surface of said alumina is passed into a stabilization section which is 12 inches in length and which is maintained, by means of the speed of said auger screw mechanism, in the section for a period of 18 minutes. After passage through the stabilization section, the semiconducting pyropolymeric inorganic refractory oxide material is then passed into a cooling section which is 36 inches in length and is maintained therein for a period of 54 minutes. In this cooling section, the semiconducting carbonaceous pyropolymeric inorganic refractory oxide material is cooled to a temperature of about 150° C. by means of a cooling jacket which surrounds the section and which is provided for with heat transfer liquids. The thus cooled semiconducting carbonaceous pyropolymeric inorganic refractory oxide material is withdrawn after passage through the cooling section and recovered. The product is recovered in an amount of approximately 175 pounds. Analysis of this product will disclose that the semiconducting carbonaceous pyropolymeric inorganic refractory oxide material will contain approximately 34% carbon and will possess a conductivity in the range of from 50 to 10 inverse ohm-centimeters, said material being measured in powdered form (100–200 mesh) under 50,000 psi pressure at 25° C.

EXAMPLE II

In a manner similar to that set forth in Example I above, gamma-alumina is fed to a reactor which has a working length of 108 inches and has an inside diameter of 6 inches at a rate of 4.8 lbs/hour and 115.2 lbs/day. Simultaneously, while the gamma-alumina is being fed to the reaction section of the reactor, benzene, which has been preheated to a temperature of about 90° C. in order to vaporize said benzene, is also fed to the reaction section of the reactor at a rate of 4.84 lbs/hour or 116.2 lbs/day. The reaction section of the reactor is maintained at a temperature of about 900° C. by electrical heating means while the alumina is maintained in a semifluidized state due to the injection of the benzene gases into the reactor. After passage through the reaction or pyrolysis section during a period of 1.5 hours, the thus formed semiconducting pyropolymeric inorganic refractory oxide material is passed to a 12 inches stabilization section and is maintained therein for a period of 18 minutes. After passage through the stabilization section, the material passes into a cooling section which is 36 inches in length and while therein is cooled at a temperature of 150° C. during a period of 54 minutes. After passage through the cooling section, the semiconducting pyropolymeric inorganic refractory oxide material is recovered, the product weighing about 204 pounds. The product is separated from water, liquid hydrocarbons and gaseous hydrocarbons and subjected to analysis. It will be found that there is approximately 42% carbon in the semiconducting carbonaceous pyropolymeric inorganic refractory oxide material which will posses a conductivity in the range of from about 50 to about 10 inverse ohm-centimeters, the conductivity again being measured by using the material in powdered form under 50,000 psi pressure at 25° C.

I claim as my invention:

1. A process for the preparation of a semiconducting carbonaceous pyropolymeric inorganic refractory oxide material which comprises continuously moving an inorganic refractory oxide material by means of a rotating screw member laterally through a reaction zone maintained at a temperature of at least about 700° C., simultaneously introducing a gaseous hydrocarbon pyropolymeric precursor into said zone in sufficient amount and sufficient pressure to effect a semifluidized contact of said inorganic refractory oxide material with said gaseous hydrocarbon during the lateral movement of the inorganic material through said zone, withdrawing and cooling the resultant semiconducting carbonaceous pyropolymeric inorganic refractory oxide material at a temperature of from about 150° C. to about 200° C., and thereafter recovering the semiconducting material.

2. The process as set forth in claim 1 in which said inorganic refractory oxide material is in the form of particles.

3. The process as set forth in claim 1 further characterized in that an inert oxygen-free gaseous stream is introduced into said reaction zone in admixture with said gaseous hydrocarbon.

4. The process as set forth in claim 1 further characterized in that an inert oxygen-free gaseous stream is introduced into said reaction zone at a point adjacent to the withdrawal area of said reaction zone to effect a stripping of said contacted material.

* * * * *